No. 653,280. Patented July 10, 1900.
F. W. BARTHELS & W. SCHAEFER.
FLANGED TUBE.
(Application filed Mar. 10, 1900.)
(No Model.)
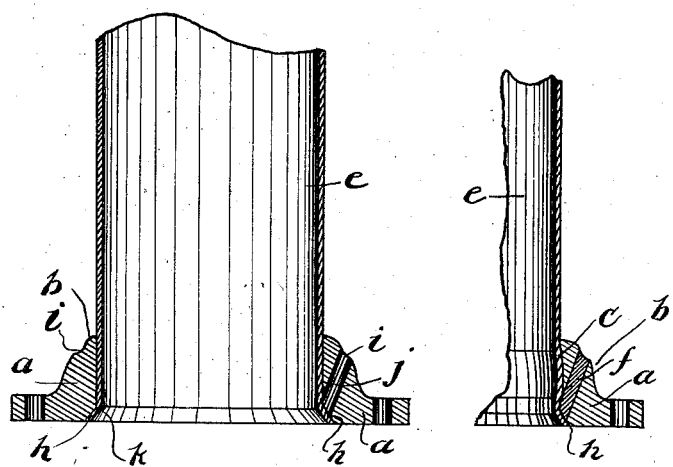
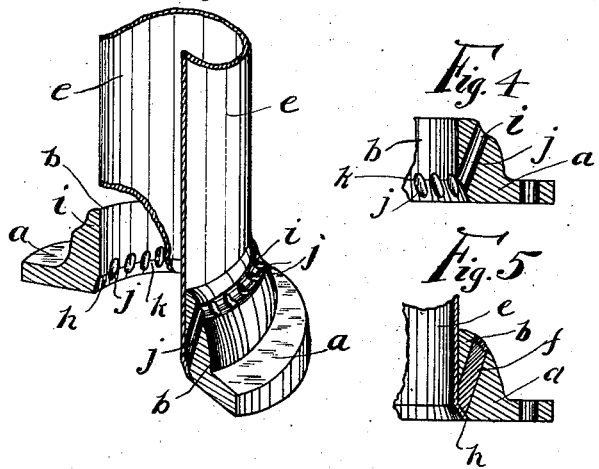
Witnesses:
G. S. Noble
Jacob Neller
Inventors,
Friedrich Wilhelm Barthels
Wilhelm Schaefer
By B. Singer Att'y,

UNITED STATES PATENT OFFICE.

FRIEDRICH WILHELM BARTHELS AND WILHELM SCHAEFER, OF HAMBURG, GERMANY.

FLANGED TUBE.

SPECIFICATION forming part of Letters Patent No. 653,280, dated July 10, 1900.

Application filed March 10, 1900. Serial No. 8,134. (No model.)

*To all whom it may concern:*

Be it known that we, FRIEDRICH WILHELM BARTHELS, manufacturer, residing at 1 Neumannstrasse 4, and WILHELM SCHAEFER, engineer, residing at Tresckowstrasse 8, Hamburg, in the German Empire, subjects of the German Emperor, have invented certain new and useful Improvements in the Manufacture of Flanged Tubes, (for which applications for patents were filed in Germany January 30, 1900; in Great Britain February 1, 1900, and in France February 2, 1900,) of which the following is a specification.

This invention has for its object to firmly unite together separately wrought or formed tubes and flanges in such manner that the melted brazing material cannot reach an injurious fusing heat at the point of union, thus obviating damage to the walls of the tube, while at the same time establishing an intimate union between the tube and the flange wherever said material has access; and it consists in the various matters hereinafter pointed out and claimed.

In order that our invention may be clearly understood and readily carried into effect, we will proceed to describe the same, with reference to the accompanying drawings, wherein—

Figure 1 is a longitudinal section of a tube and flange made in accordance with our invention, as they appear attached together before brazing. Fig. 2 is a fragmentary view showing the parts brazed together. Fig. 3 is a perspective sectional view of an unbrazed tube and flange attached together ready for the introduction of brazing material. Fig. 4 is a fragmentary detail illustrating the constructional form of the flange, and Fig. 5 also a fragmentary detail showing flange of slightly-modified form and tube and flange brazed together.

Like letters of reference indicate corresponding parts.

The flange $a$ is formed with a collar or hub $b$ at the inner annular edge thereof, constituting a sleeve for the reception of the end of the tube $e$, as shown. The central aperture in the flange for the reception of said tube has a chamfered lower edge or face $h$, over which the end of the pipe is swaged, and, if desired, said central aperture may be recessed, cupped, or concaved, as at $c$, Fig. 2, to receive an expanded part of the tube.

Near the upper part of the hub $b$ is an exterior circumferential groove $i$, from which a number of ducts or channels $j$ lead obliquely toward the inner periphery of the flange, debouching at the chamfered face $h$. These channels are disposed close to each other and so as to leave but little material between them. In Fig. 3 the debouchment of the channels is partly into the cylindrical bore and partly into the chamfered face, so that shoulders or projections $k$ are formed by the webs between the channels at the angle between said bore and face, while in Fig. 5 the debouchment is entirely within the chamfered face $h$ and no such shoulders are occasioned. In said latter figure also the exterior groove $i$ is omitted.

The tube $e$, to which the flange is to be attached, is drawn into the collar of the flange and then hammered or spun over the chamfered face $h$ and into the recess $c$, when the latter is provided. The channels are then filled with brazing material $f$, and the flange and collar are heated in any suitable manner until the brazing material melts, thus forming a tight joint not only at the parts where the channels debouch, but also, owing to the capillary attraction, at the parts situated between the successive channels. The brazing material also creeps up and effects a union between the collar and tube above the line of debouchment. By this procedure the melted metal contained in the channels cannot fuse the walls of the tube, as it will have already begun to part with its heat by the time it reaches and fills in the surfaces where it is in direct contact with the tube. The solidity of the joint thus effected is increased by the hammering of the tube into the recess $c$ and down upon the chamfered face $h$, the extended and upset edge of said tube giving additional strength.

What we claim as our invention, and desire to secure by Letters Patent, is—

1. The combination of a tube and a flange having a hub or collar with recessed internal bore for the reception and expanding of the tube, and a series of closely-proximate channels leading from the exterior of said hub to the internal bore for the reception of brazing material, whereby when heat is applied said material melts, runs down the channels and forms a union between the tube and flange.

2. The combination of a tube, and a flange having a collar or hub to embrace said tube, and chamfered edge or face to said hub over which the end of the tube is upset, and a series of closely-proximate channels leading from the exterior of said hub to the chamfered face for the reception of brazing material, whereby when heat is applied to the flange said material melts and brazes together flange and hub.

3. The combination of a tube and a flange having a hub or collar with recessed and chamfered internal bore for the reception, expansion and upsetting of the tube, and a series of closely-proximate channels leading from the exterior of the hub to the internal bore at the chamfered portion thereof, as and for the purpose described.

In testimony whereof we affix our signatures in presence of two witnesses.

FRIEDRICH WILHELM BARTHELS.
WILHELM SCHAEFER.

Witnesses:
E. H. L. MUMMENHOFF,
IDA HAFERMANN.